Aug. 18, 1931.  K. J. WERSALL  1,819,829
CENTRIFUGAL CLUTCH
Filed March 16, 1929

INVENTOR
Karl J. Wersall,
BY
ATTORNEY

Patented Aug. 18, 1931

1,819,829

UNITED STATES PATENT OFFICE

KARL J. WERSALL, OF NEW YORK, N. Y., ASSIGNOR TO AMERICAN KAMBI COMPANY, OF NEW YORK, N. Y., A CORPORATION OF DELAWARE

CENTRIFUGAL CLUTCH

Application filed March 16, 1929. Serial No. 347,529.

This invention relates to centrifugal friction clutches in which a weighted friction band or a series of flexibly-connected friction bodies or shoes are used, the object of the invention being to provide an improved clutch of this class, simple in construction, efficient in use, and in which the weighted band or the several flexibly-connected shoes will have a uniformly and evenly distributed wear on the brake lining and the driven member of the clutch.

In centrifugal clutches of the kind described where a weighted band or series of flexibly-connected friction bodies or shoes are used, it has heretofore been impossible to get a uniform wear on the friction or brake lining or shoes or track, in view of the fact that the rear bodies of the series of shoes, aside from acting against the track, tend to pull the friction bodies ahead of them toward the center of the clutch and thus lighten the pressure of certain of the friction bodies against the track; and, therefore, the present improvement has for its object the elimination of this disadvantage.

In the drawings accompanying and forming a part of this specification—

Similar characters of reference indicate corresponding parts in the several views.

Figure 1:
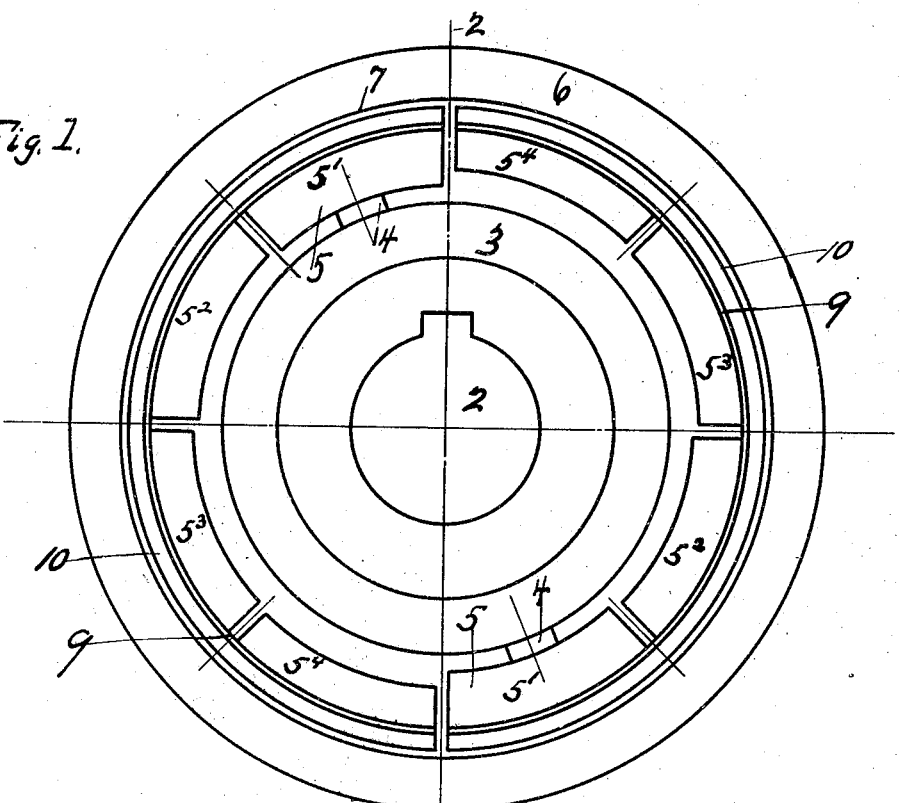
Figure 1 is a side view of one form of this improved clutch.
Figure 2:
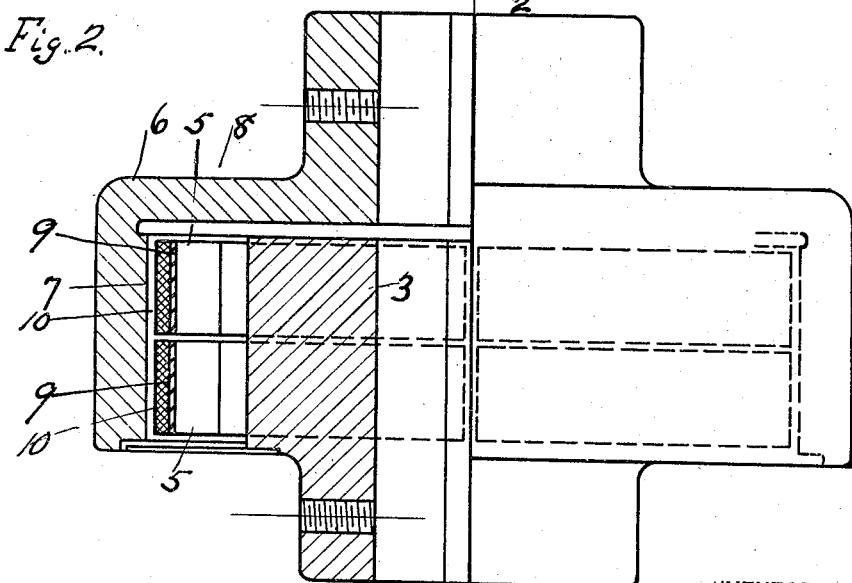
Fig. 2 is a cross-sectional view thereof taken on line 2—2, of Fig. 1.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

In the present improvement, in the preferred form thereof, the driving member 2 comprises a driving disk 3 adapted to be fixed to a suitable shaft and provided with a radially-projecting pin or pins 4 for driving a flexible weighted band or system of flexibly-connected radially-shiftable, bodies or shoes 5. In the present improvement the shoe system 5 can be made long enough to extend entirely around the track or only part-way thereof, and in the present instance two duplicate, parallelly-located, sets of similarly-formed shoes are shown, each set comprising a series of four shoes $5^1$, $5^2$, $5^3$ and $5^4$ having its forward shoe $5^1$ connected with a driving pin 4, these shoe systems being so located as to secure a balancing of the centrifugal powers,—for instance, when parallel shoe systems are used extending entirely around the track, the driving pin of one system will be diametrically opposite to that of the other. The driven member 6 likewise comprises a disk 8 adapted to be fixed to a driven shaft and having a friction surface 7 overlapping and concentric with the driving disk.

Heretofore in the rotation of the driving member of the clutch, the entire series of shoes was brought into rotation by means of the driving pin fastened to the driver and thus the flexibly-connected shoes were thrown against the track by centrifugal action. Consequently, when this shoe system with all the shoes of equal weight engaged the track and the friction acted on each shoe, the power necessary to drive the rearmost shoe or that shoe, as $5^4$, furthest from the driving pin 4, tended to pull the next shoe, as $5^3$, toward the center of the clutch; and the driving power necessary to drive the two rear shoes $5^3$ and $5^4$ acting between the shoes $5^2$ and $5^3$, tended to lighten the pressure of the shoe $5^2$ against the track and also pull the shoe $5^3$ located between the shoes $5^2$ and $5^4$ toward the center of the clutch. Hence with all four shoes of equal weight, their pressure against the track was successively less, counting from the rear shoe $5^4$. This resulted in a very unevenly-distributed and non-uniform wear on the shoes, brake lining, and track; and the object of the present improvement, therefore, is to prevent this serious disadvantage.

Connected to each of the pins 4 is a shoe system 5 (four such systems being shown), each comprising, in the present instance, four radially-shiftable friction shoes, the forward one, 5¹, of which is loosely carried by the pin and the three succeeding ones, 5², 5³ and 5⁴, of which are connected with the first shoe by a flexible band 9 in the form of a steel band which may be provided with a brake lining or friction surface 10, if desired, to take up the frictional wear. Commencing with the rear shoe 5⁴, each shoe is made heavier than the preceding one (for instance, shoe 5³ is heavier than shoe 5⁴ and shoe 5² is heavier than shoe 5³, while shoe 5¹ is heavier than any of the succeeding shoes), whereupon on the rotation of the driving means through the pins, these shoes are rotated; and as they are successively of different weights, it follows that the wear on the brake lining will be evenly distributed since the pressure of the shoes against the track will be uniform instead of successively less, as would be the case were the shoes of equal weight, thus giving a uniform wear on the several shoes and the track.

Thus in the present improvement each flexible steel band has successively-decreasing weight, obtained in the present instance by securing thereto from the front end thereof a plurality of decreasing weighted bodies.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. A centrifugal friction clutch comprising a driving means, a driven means, and a plurality of flexibly-connected, radially-shiftable bodies connected with the driving means and having successively decreasing weights, no two alike.

2. A centrifugal friction clutch comprising a driving means, a driven means, and a flexible friction body connected with the driving means and radially-shiftable relatively thereto and having decreasing weight from the point of connection with the driving means toward the rear.

3. A centrifugal friction clutch comprising a rotary driving means, a driven means, a radial pin carried by said driving means, a radially-shiftable body connected with said pin, and a plurality of flexibly-connected bodies connected with said first body and of relatively decreasing weights.

4. In a centrifugal friction clutch, the combination of a rotary driving means, a driven means, a plurality of radially-located pins carried by the driving means, and a plurality of bodies connected with each of said driving pins and flexibly connected one with another and having successively decreasing weights.

5. A centrifugal friction clutch comprising a driving means, a driven means, and a plurality of successively decreasing weighted bodies no two alike flexibly connected, the forward body having a loose connection with the driving means.

6. A centrifugal friction clutch comprising a driving means, a driven means, and a shoe system connected with the driving means and having one a different weight than another and all driven through the medium of the heaviest of said shoes.

7. A centrifugal friction clutch comprising a driving means, a driven means, and a flexible band connected with said driving means for radial movement relatively thereto and rotated thereby and having progressively decreasing weight.

8. A centrifugal friction clutch comprising a driving means, a driven means, and a flexible band connected with said driving means and rotated thereby and having bodies, successively decreasing in weight secured thereto with the heaviest thereof adjacent to said driving means.

9. A centrifugal friction clutch comprising a rotary driving means having a radial pin, a driven means having a friction track, and a flexible band loosely connected to said pin for rotation thereby and having bodies successively decreasing in weight carried thereby.

10. A centrifugal friction clutch comprising a rotary driving means having radial pins, a driven means having a friction track, and a plurality of flexible bands located end to end and loosely connected with said pins for rotation thereby and each having bodies successively decreasing in weight, carried thereby.

11. A centrifugal friction clutch comprising a rotary driving means having radial pins, a driven means having a friction track, and a plurality of parallelly-located flexible bands loosely connected with said pins for rotation thereby and each having bodies successively decreasing in weight, carried thereby.

12. A centrifugal friction clutch comprising a rotary driving means having radial pins, a driven means having a friction track, and a plurality of flexible bands located end to end and in parallel sets and loosely connected with said pins for rotation thereby and each having bodies successively decreasing in weight, carried thereby.

Signed at New York, county of New York and State of New York, this 2nd day of March, 1929.

KARL J. WERSALL.